May 11, 1965    E. K. STRAND    3,182,373
HOSE CLAMP
Filed Sept. 3, 1963
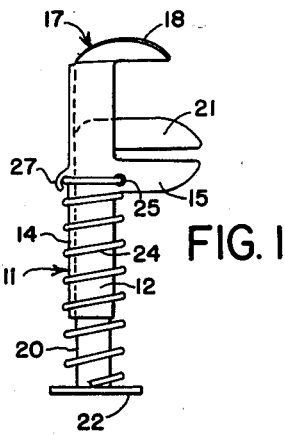
FIG. 1
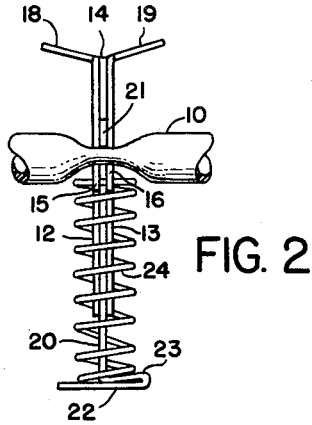
FIG. 2
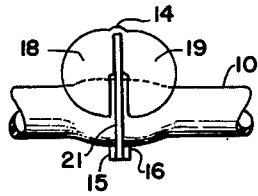
FIG. 3
FIG. 4
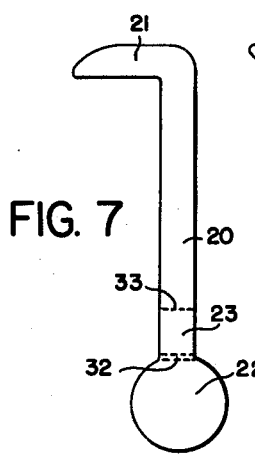
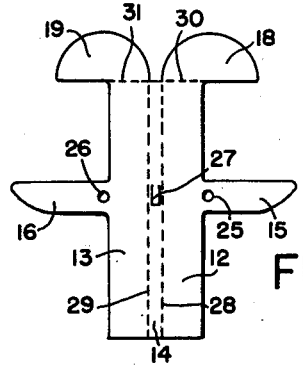
FIG. 6
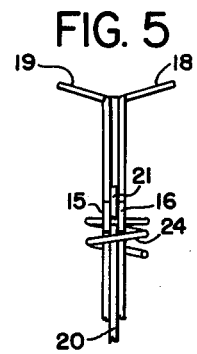
FIG. 5
FIG. 7
INVENTOR.
ERLING K. STRAND
BY *Moore, White & Burd*
ATTORNEYS

United States Patent Office 3,182,373
Patented May 11, 1965

3,182,373
HOSE CLAMP
Erling K. Strand, Bloomington, Minn., assignor to Margaret C. L. Strand and Patricia A. O'Hare, St. Paul and Minneapolis, Minn., respectively
Filed Sept. 3, 1963, Ser. No. 306,253
3 Claims. (Cl. 24—263)

This invention relates to a clamp for shutting off the flow through flexible hose or tubing composed of rubber or synthetic rubber-like or plastic materials, such as vinyl chloride, tetrafluoroethylene and the like. More particularly, this invention relates to a hose clamp of simple, economical construction, composed of a minimum number of parts, which is, at the same time, highly effective for its intended clamping purpose.

The invention is illustrated by the drawings in which the same numerals refer to corresponding parts and in which:

FIGURE 1 is a side elevation of the clamp according to the present invention, shown partially compressed to receive a hose or tube between its jaws, in clamping position, but with the hose or tubing omitted for clarity;

FIGURE 2 is a front elevation of the clamp in partially compressed clamping position, as in FIGURE 1, but showing the clamped hose or tube in place;

FIGURE 3 is a top plan view of the clamp, as shown in FIGURE 2;

FIGURE 4 is a fragmentary side elevation similar to FIGURE 1, but shown with the clamp in relaxed position;

FIGURE 5 is a fragmentary front elevation of the clamp, as shown in FIGURE 4;

FIGURE 6 is a plan of a sheet metal blank from which the upper part of the body and outer clamp jaws are formed; and FIGURE 7 is a plan of a sheet metal blank from which the remainder of the clamp body and inner jaw are formed.

Referring now to the drawings, and particularly FIGURES 1 through 3, there is shown the clamp according to the present invention in clamping position. The hose 10 which is closed off by action of the clamp is shown in FIGURES 2 and 3, but is omitted from FIGURE 1 for clarity.

The clamp is comprised of an upper elongated body portion 11, having a pair of generally parallel spaced-apart side walls 12 and 13, connected together by means of a relatively narrow back wall portion 14. Projecting forward from the front edge of each of side walls 12 and 13 in generally the same plane and intermediate of the ends of the side walls are a pair of outer jaw members 15 and 16, respectively. The uppermost edges of the jaw members 15 and 16 are preferably flat and smooth to avoid damage to the hose or tubing. At the upper end of the outer clamp body 11 is a thumb or finger-gripping area indicated generally at 17 and comprised of a pair of relatively flat wing-like members 18 and 19, projecting outwardly from side walls 12 and 13, respectively, and generally perpendicular thereto.

A lower clamp body member 20 is flat and elongated and adapted to fit telescopically with a slide fit between the side walls 12 and 13 of the upper body 11. The upper end of lower clamp body portion 20 is provided with a projecting inner jaw element 21 adapted to co-act with outer jaw members 15 and 16 to impose the desired clamping action on hose or tubing. The lower edge of jaw member 21 is likewise preferably flat and smooth on its hose engaging surface.

The opposite end of inner clamp body portion 20 is provided with a thumb or fingergrip member 22 connected to the lower body portion by an integral link 23 which is an extension of the body member 20. Link 23 is bent flat against the gripping member 22 and is generally perpendicular to the body portion 20.

The clamp is assembled by inserting the lower body member 20 telescopically within the upper body 11 between the side walls 12 and 13 with the jaw members extending in the same direction and with the thumb or finger-grips at oposite ends of the assembled clamp. A compression spring 24 is coiled about the lower ends of the body members 11 and 20. One end of spring 24 bears against the surfaces of the lower finger-grip 22 and link 23. The opposite end of spring 24 is desirably threaded through a pair of holes 25 and 26 in the body 11, adjacent the junctures of outer jaw members 15 and 16 with body side walls 12 and 13, respectively. The upper end of coil spring 24 is also desirably held against a stop or detent 27, pressed outwardly from the back wall portion 14 of the upper body.

With one end of spring 24 held fixed by means of stop 27 and holes 25 and 26, the oposite end of the spring exerts pressure upon the bottom finger-grip 22. This action of the spring tends to push the bottom finger-grip 22 and the lower body portion 20 carrying inner jaw 21 away from the upper finger-grip 17 at the opposite end of the clamp. This pressure of the spring causes the jaw members to come together.

As shown in FIGURES 4 and 5, when the clamp is in its relaxed position, with spring 24 at its maximum extension, the bottom edge of inner jaw member 21 comes to rest against the stop formed by the portion of spring 24 which extends through holes 25 and 26. As will also be noted in these figures, when the jaws are in this position, the jaw members are intermeshed with their surfaces overlapped. This insures that when a piece of hose or tubing is inserted between the jaws, a tight, sure clamping action is obtained, as shown in FIGURE 2.

When it is desired to use the clamp to shut off the flow in a hose or tubing, the clamp is grasped between thumb and finger with one on finger-grip 17 and the other on finger-grip 22. As the finger-grips are pushed together against the pressure of compression spring 24, the lower body portion 20 is pushed telescopically upwardly into upper body 11 to force the jaw members apart. When the jaw members are pushed sufficiently far apart, they are slipped over the hose and pressure on the finger-grips is released. This causes compression spring 24 to urge the finger-grips apart and the jaw members together into clamping position.

The hose may be clamped anywhere along its length without any necessity for disconnecting the ends of the hose or tubing. Where the hose or tubing has relatively thick walls which make clamping relatively difficult, or where the hose or tubing is relatively stiff, an effective seal can usually be accomplished by bending the hose or tubing with the fingers about the clamping edge of inner jaw 21.

The simple construction of the hose clamp of the present invention is revealed in FIGURES 6 and 7, wherein are shown blanks from which the clamp is formed. These two blanks, stamped or otherwise formed from sheet metal, plus the compression spring, make up the total components of the clamp.

In FIGURE 6 there is shown the blank from which the upper body with its side walls 12 and 13, its back wall 14, outer jaw members 15 and 16, and upper finger-grip members 18 and 19 are formed. This blank is bent along fold lines 28 and 29 which are spaced apart a sufficient distance to receive the lower body element 20 with a loose telescoping slide fit until the side wall members 12 and 13 are substantially parallel. The wing-like members 18 and 19 are bent along fold lines 30 and 31, respectively, in the opposite direction until they are substantially perpendicular to the side wall members 12 and 13 in order to form the top finger-grip 17.

The inner body is formed from the blank illustrated in FIGURE 7 by bending along the fold line 32 until the link portion 23 is substantially flat against the surface of the lower finger-grip 22 and then bending the body portion 20 in the opposite direction along fold line 33 until the body portion 20 is substantially perpendicular to the lower finger-grip 22.

These component parts are readily assembled with the compression spring to complete the clamp. The clamp is desirably formed from durable material, such as 0.05 inch stainless steel or the like. It will be understood, however, that claim for patentability is made upon the novel construction of the clamp independent of the materials from which it may be made.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A clamp for shutting off flow in a flexible hose or tubing, which clamp comprises:
 (A) a rigid sheet metal body including
  (1) an elongated flat outer body member having
   (a) a pair of substantially parallel spaced apart elongated side walls
    (i) interconnected along one longitudinal edge and
    (ii) open along the other edge, and
  (2) an elongated flat inner body member
   (a) fitted telescopically within the outer body body member
   (b) between the spaced apart side walls
   (c) for limited longitudinal sliding movement with respect thereto;
 (B) a pair of opposed clamping jaws,
  (1) one of said jaws being bifurcated, the elements of said jaw being
   (a) integral with the side walls of the outer body member,
   (b) generally parallel, and
   (c) extending generally perpendicularly outwardly from one longitudinal edge of said outer body member, intermediate of the ends thereof,
  (2) the other of said jaws being
   (a) integral with the inner body member and
   (b) extending generally perpendicularly outwardly therefrom;
 (C) a pair of opposed finger grips, at opposite ends of the body,
  (1) one of said finger grips including a pair of wing-like members
   (a) integral with the side walls of the outer body member,
   (b) extending generally perpendicularly outwardly from the planes of said side walls in opposite directions, at the free end of the outer body member,
  (2) the other of said finger grips being
   (a) integral with the inner body member,
   (b) extending generally perpendicular to the plane of said inner body member,
   (c) at the free end thereof;
 (D) said jaws and finger grips being disposed relative to one another so that
  (1) said bifurcated jaw lies between said other jaw and the finger grip at the end of the inner body member, and
  (2) said other jaw lies between the bifurcated jaw and the finger grip at the end of the outer body member, whereby
  (3) said jaws are separated to receive or disengage a hose or tubing when the finger grips are moved toward one another;
 (E) compression coil spring means
  (1) disposed between the finger grip at the end of the inner body member and the bifurcated jaw,
  (2) around the telescoped body members,
  (3) normally urging said jaws together into clamping position, and
  (4) normally urging said finger grips apart,
  (5) said compression spring means being compressible to open said jaws by finger pressure on said finger grips urging said finger grips toward one another; and
 (F) stop means
  (1) adjacent said bifurcated jaw,
  (2) limiting movement of said jaws past one another while
  (3) permitting slight intermeshing of the clamping edge of said jaw connected to the inner body member between the clamping edges of the bifurcated jaw.

2. A clamp according to claim 1 further characterized in that said body members, jaws and finger grips are composed of rigid stainless steel sheet.

3. A clamp for shutting off flow in a flexible hose or tubing, which clamp comprises:
 (A) a body including
  (1) an elongated outer body member including a pair of substantially parallel spaced apart elongated side walls interconnected along one longitudinal edge and open along the other edge, and
  (2) an elongated inner body member
   (a) fitted telescopically within the outer body member between the side walls of the outer body member in the open edge thereof
   (b) for longitudinal sliding movement with respect thereto;
 (B) a pair of opposed jaws,
  (1) one of said jaws being bifurcated and connected to and extending outward from said outer body member, the elements thereof each extending outwardly from one of the outer body member side walls,
  (2) the other of said jaws being connected to and extending outward from said inner body member;
 (C) a pair of opposed finger grips at opposite ends of the body,
  (1) one of said finger grips being connected to the free end of said outer body member,
  (2) the other of said finger grips being connected to the free end of said inner body member;
 (D) said jaws and finger grips being disposed relative to one another so that
  (1) said jaw connected to said inner body member lies between said other jaw and the finger grip connected to said outer body member, and
  (2) said other jaw connected to said outer body member lies between the jaw connected to said inner body member and the other finger grip connected to said inner body member, whereby
  (3) said jaws are separated when said finger grips move toward one another;
 (E) compression spring means
  (1) disposed between the finger grip connected to the inner body member and the jaw member connected to the outer body member,
  (2) around said telescoped body members,
  (3) normally urging said jaws together into clamping position and
  (4) normally urging said finger grips apart,
  (5) said compression spring means being compressible to open said jaws by finger pressure on said finger grips urging said finger grips toward one another; and
 (F) stop means limiting movement of said jaws past one another.

(References on following page)

References Cited by the Examiner

UNITED STATES PATENTS

| | | | |
|---|---|---|---|
| 101,037 | 3/70 | Pray | 24—263 X |
| 202,704 | 4/78 | Clark et al. | |
| 208,018 | 9/78 | Koch. | |
| 650,660 | 5/00 | Schoonmaker. | |
| 2,173,953 | 9/39 | Schwisow. | |
| 2,358,118 | 9/44 | Williams | 24—263 X |
| 2,614,788 | 10/52 | Woodward | 251—7 X |

FOREIGN PATENTS 43,998   1888   Germany.

DONLEY J. STOCKING, *Primary Examiner.*